JAMES W. WARD.

Improvement in Tea Kettles.

No. 124,462. Patented March 12, 1872.

WITNESSES
Jno. B. McClure
S. M. Howard

INVENTOR
James W. Ward.

UNITED STATES PATENT OFFICE.

JAMES W. WARD, OF WHEELING, WEST VIRGINIA, ASSIGNOR TO HIMSELF AND J. BOONE McLURE, OF SAME PLACE.

IMPROVEMENT IN TEA-KETTLES.

Specification forming part of Letters Patent No. 124,462, dated March 12, 1872; antedated February 24, 1872.

SPECIFICATION.

*To all whom it may concern:*

Be it known that I, JAMES W. WARD, of Wheeling, in the county of Ohio and State of West Virginia, have invented certain Improvements in Tea-Kettles, of which the following is a specification, reference being had to the accompanying drawing and the letters of reference thereon.

Figure 1:
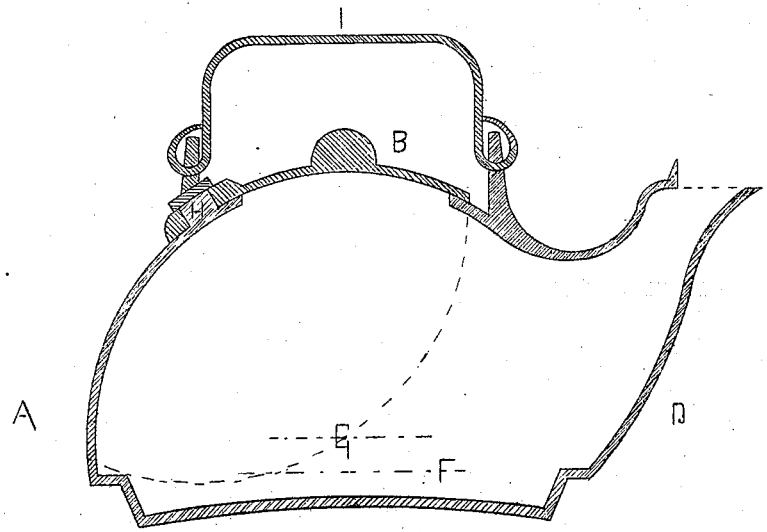
Figure 2:
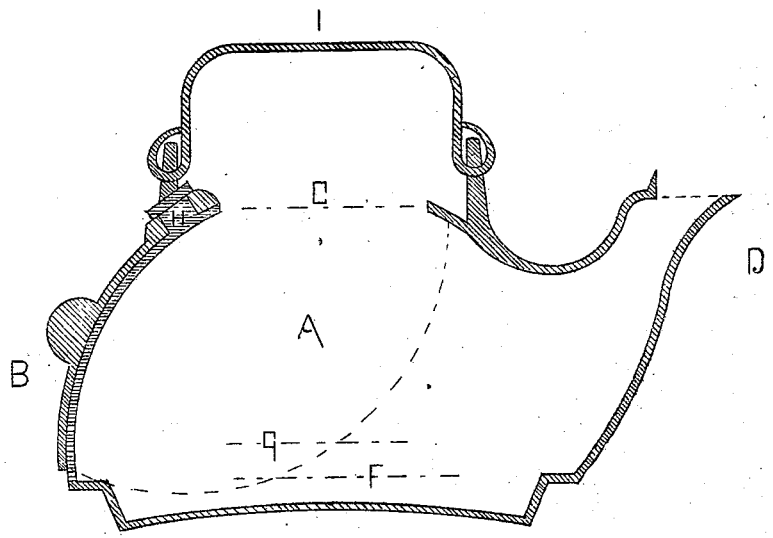

Figure 1 is a perpendicular sectional view through the center of the kettle, showing its spherical shape and the place of the attachment of the lid thereto. Fig. 2 is a like view, but further showing the position of the lid when off the opening, the course of its movement while going off, and the way it fits to and encircles the body of the kettle when so off.

My invention consists in making that part of a tea-kettle opposite the spout, and also the lid, spherical, or as near a sphere in shape as practical, and in fitting and adapting the parts so that the cover or lid shall swing upon and close to the side and rear of the kettle when it is turned back or moved off its resting place on top of the kettle.

The transverse diameter G is as far above its seat F as the diameter of the lid may make necessary for the proper opening of the former, as hereinafter described. The inside curvature of the lid B is made such that it will fit to and encircle the outside curvature of the body of the kettle, when the lid is thrown off the opening C, and around the kettle by means of its attachment thereto, as hereinafter described. The body and lid of the kettle being thus constructed, the lid B is pivoted at its projection H to the outside of the kettle at a point near the opening C, and in a line with the attachments of the bail I to the kettle; and being so pivoted it will revolve on said pivot, and while revolving and off the opening C it will fit to and encircle or embrace the body of the the kettle A, as represented in Fig. 2. To make the same I prepare wooden or metal patterns, from which to mold in sand and cast in metal the kettle. The same may be made of tin by the well-known ways of doing such work.

A tea-kettle thus constructed not only gives a convenient movement of the lid, but its shape enables it to hold more water than any before made having the same base and diameter.

I do not claim as my invention a tea-kettle having a globular shape round and about its center, with a flat or depressed top; but

What I claim as my invention, and desire to secure by Letters Patent, is—

1. The tea-kettle, herein described, with the part opposite the spout spherical or nearly so, and the lid B of like shape, and so adapted to and fitted upon the kettle as that it shall, in swinging off or on, embrace the outside curvature thereof.

2. The lid B, arranged and constructed to fit to and encircle the kettle A when off the opening C, substantially as and for the purpose herein set forth.

JAMES W. WARD.

Witnesses:
J. BOONE McLURE,
WM. J. MOORHEAD.